(12) United States Patent
Tatavarthi et al.

(10) Patent No.: US 9,879,616 B2
(45) Date of Patent: Jan. 30, 2018

(54) SYSTEM AND METHOD FOR ADJUSTING THE LIFT STATE OF A VALVE ACTUATOR AND FOR ADJUSTING THE NUMBER OF ACTIVE CYLINDERS IN AN ENGINE TO IMPROVE FUEL ECONOMY

(71) Applicant: GM Global Technology Operations LLC, Detroit, MI (US)

(72) Inventors: Ramakrishna Tatavarthi, Rochester Hills, MI (US); Andrew J. Kosanka, Atlas, MI (US); Jinbiao Li, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 15/133,582

(22) Filed: Apr. 20, 2016

(65) Prior Publication Data
US 2017/0306859 A1 Oct. 26, 2017

(51) Int. Cl.
*F01L 1/34* (2006.01)
*F02D 13/02* (2006.01)
*F01L 13/00* (2006.01)
*F02D 41/00* (2006.01)

(52) U.S. Cl.
CPC ...... *F02D 13/0207* (2013.01); *F01L 13/0005* (2013.01); *F01L 13/0015* (2013.01); *F02D 41/0087* (2013.01); *F01L 2013/001* (2013.01)

(58) Field of Classification Search
CPC .............. F02D 13/0207; F02D 41/0087; F01L 13/0005; F01L 13/0015; F01L 2013/001
USPC ................................ 123/90.15, 90.16, 90.18
See application file for complete search history.

(56) References Cited

U.S. PATENT DOCUMENTS 9,488,078 B2 * 11/2016 Douglas .................... F01L 9/04
123/90.16

* cited by examiner

*Primary Examiner* — Ching Chang

(57) ABSTRACT

A system according to the present disclosure includes a cylinder deactivation module and a valve lift control module. The cylinder deactivation module selectively deactivates a first cylinder of an engine while a second cylinder of the engine is active. When the first cylinder is deactivated, the valve lift control module selectively adjusts a target lift state of a valve actuator of the engine to a first lift state to lift at least one of an intake valve of the second cylinder and an exhaust valve of the second cylinder by a first amount. The valve lift control module selectively adjusts the target lift state of the valve actuator to a second lift state to lift at least one of the intake valve and the exhaust valve by a second amount. The first and second amounts are greater than zero and the second amount is greater than the first amount.

20 Claims, 5 Drawing Sheets

SYSTEM AND METHOD FOR ADJUSTING THE LIFT STATE OF A VALVE ACTUATOR AND FOR ADJUSTING THE NUMBER OF ACTIVE CYLINDERS IN AN ENGINE TO IMPROVE FUEL ECONOMY

FIELD

The present disclosure relates to internal combustion engines, and more specifically, to systems and methods for adjusting the lift state of a valve actuator and for adjusting the number of active cylinders in an engine to improve fuel economy.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some engine control systems deactivate cylinders of an engine as the amount of load on the engine decreases in order to improve fuel economy. In one example, an engine control system deactivates a predetermined number of cylinders of an engine when the engine can produce enough torque to satisfy the acceleration demands of a driver while the cylinders are deactivated. The engine control system then reactivates the deactivated cylinders when the engine can no longer produce enough torque to satisfy the acceleration demands of the driver while the cylinders are deactivated.

Some engine control systems improve fuel economy by switching a valve lift actuator from a high lift state to a low lift state to decrease the amount by which an intake valve of a cylinder is lifted from its valve seat. In one example, an engine control system switches a valve lift actuator from a high lift state to a low lift state when the engine can produce enough torque to satisfy the acceleration demands of a driver while the valve lift actuator is in the low lift sate. The engine control system then switches the valve lift actuator back to the high lift state when the engine can no longer produce enough torque to satisfy the acceleration demands of the driver.

SUMMARY

A system according to the present disclosure includes a cylinder deactivation module and a valve lift control module. The cylinder deactivation module selectively deactivates a first cylinder of an engine while a second cylinder of the engine is active. When the first cylinder is deactivated, the valve lift control module selectively adjusts a target lift state of a valve actuator of the engine to a first lift state to lift at least one of an intake valve of the second cylinder and an exhaust valve of the second cylinder by a first amount. The valve lift control module selectively adjusts the target lift state of the valve actuator to a second lift state to lift at least one of the intake valve and the exhaust valve by a second amount. The first and second amounts are greater than zero and the second amount is greater than the first amount.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Conventionally, the amount by which an intake or exhaust valve of a cylinder is lifted when a valve lift actuator is in a low lift state is significantly less than the amount by which the intake or exhaust valve is lifted when the valve lift actuator is in a high lift state. In one example, an intake valve is lifted by 4 millimeters (mm) when a valve lift actuator is in a low lift state, and the intake valve is lifted by 10.5 mm when the valve lift actuator is in a high lift state. Thus, the amount of torque that an engine is capable of producing when the valve lift actuators are in a low lift state is significantly less than the amount of torque that the engine is capable of producing when the valve lift actuators are in a high lift state. Therefore, conventional engine control systems typically do not switch valve lift actuators of an engine from a high lift state to a low lift state when cylinders of the engine are deactivated since doing so may cause the engine to stall.

An engine control system and method according to the principles of the present disclosure transitions between valve lift states and cylinder activation states in a manner that maximizes fuel economy while avoiding engine performance issues such as engine stalls. In one example, when the amount of load on the engine is less than a first threshold, the system and method deactivates one or more cylinders in an engine and adjusts an intake valve actuator to a low lift state. In the low lift state, the intake valve actuator may lift the intake valve by a greater amount relative to conventional valve actuators. For example, in the low lift state, the intake valve actuator may lift the intake valve by 7.5 mm. Thus, adjusting the intake valve actuator to the low lift state when cylinders of the engine are deactivated is less likely to cause an engine stall.

When the engine load is greater than the first threshold and less than a second threshold, the system and method activates all of the cylinders in the engine while maintaining the intake valve actuator in the low lift state. When the engine load is greater than the second threshold, the system and method adjusts the intake valve actuator to a high lift state while maintaining all of the cylinders in an active state. The system and method may determine the first and second thresholds based on the speed of the engine.

The relationship between the first threshold and the engine speed and the relationship between the second threshold and the engine speed may be predetermined to maximize fuel economy while minimizing valve timing adjustments. In addition, the system and method may not adjust the intake valve actuator to the high lift state when one or more cylinders of the engine are deactivated. Avoiding this engine operating mode may further minimize valve timing adjustments and maximize fuel economy.

Figure 1:
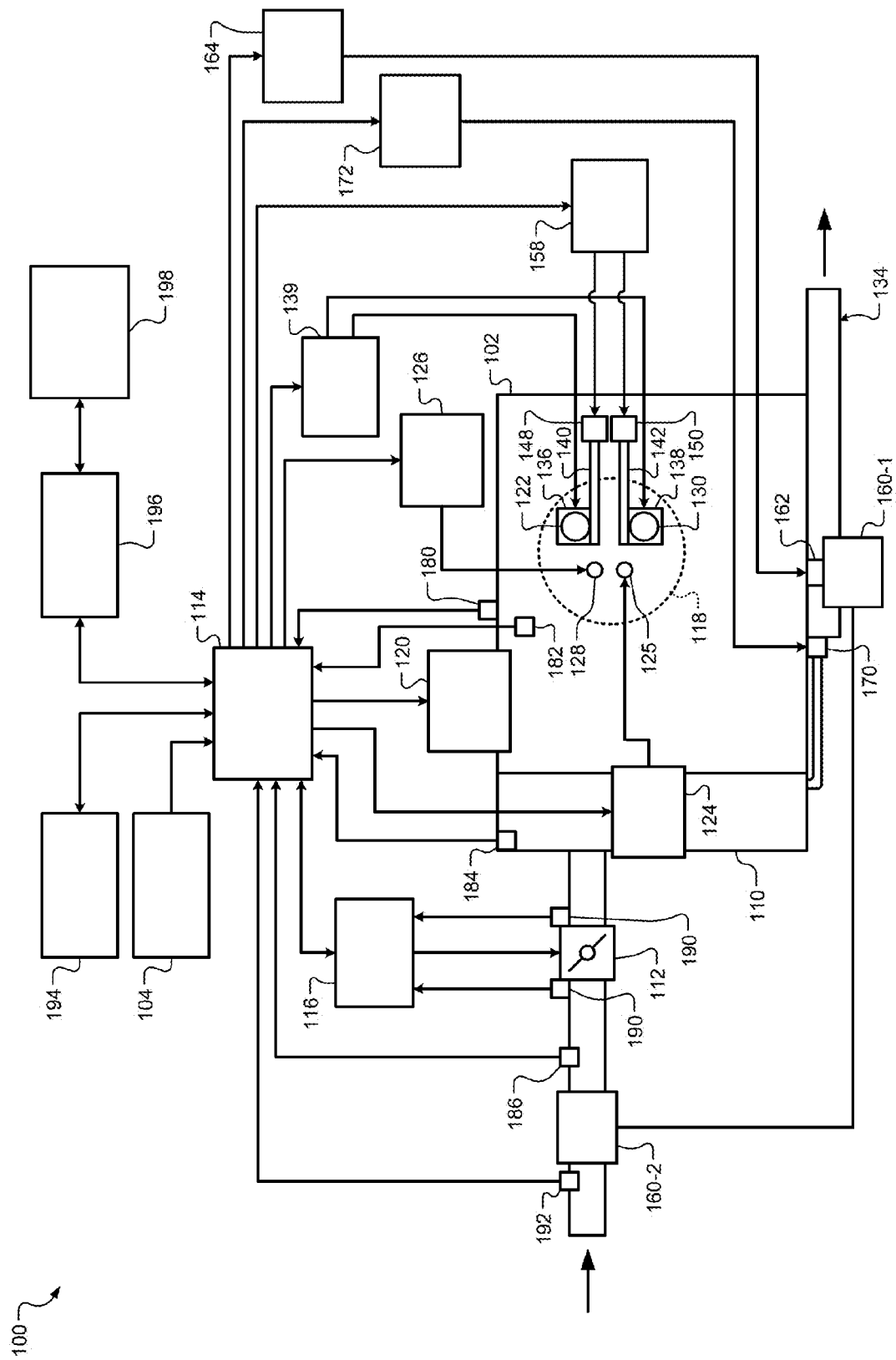
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 is actuated using an intake valve actuator 136, while the exhaust valve 130 is actuated using an exhaust valve actuator 138. A valve lift actuator module 139 may control the intake and exhaust valve actuators 136 and 138 based on signals from the ECM 114. In various implementations, the intake valve actuator 136 may actuate multiple intake valves (including the intake valve 122) of the cylinder 118. Similarly, the exhaust valve actuator 138 may actuate multiple exhaust valves (including the exhaust valve 130) of the cylinder 118. Additionally, a single valve actuator may actuate one or more exhaust valves of the cylinder 118 and one or more intake valves of the cylinder 118. Further, the intake valve actuator 136 may actuate multiple intake valves of multiple cylinders, and the exhaust valve actuator 138 may actuate multiple exhaust valves of multiple cylinders.

In various implementations, the intake valve actuator 136 may be driven by an intake camshaft 140, and the exhaust valve actuator 138 may be driven by an exhaust camshaft 142. For example, the intake valve actuator 136 may include a rocker arm and a cam follower coupled to the rocker arm. The rocker arm may lift the intake valve 122 from its valve seat when the cam follower engages a lobe on the intake camshaft 140. Similarly, the exhaust valve actuator 138 may include a rocker arm and a cam follower coupled to the rocker arm. The rocker arm may lift the exhaust valve 130 from its valve seat when the cam follower engages a lobe on the exhaust camshaft 142.

In other implementations, the intake and exhaust valve actuators 136 and 138 may actuate the intake and exhaust valves 122 and 130 independent of a camshaft. For example, the intake and exhaust valves 122 and 130 may be electromagnetic or electrohydraulic valve actuators. In these implementations, the intake and exhaust valve actuators 136 and 138 may be referred to as camless valve actuators.

The intake and exhaust valve actuators 136 and 138 may vary the amount by which the intake and exhaust valves 122 and 130 are lifted from their respective valve seats. For example, the intake and exhaust valve actuators 136 and 138 may switch between a first lift state and a second lift state. The intake and exhaust valve actuators 136 and 138 may cause the intake and exhaust valves 122 and 130 to lift from their respective valve seats by a first amount when operating in the first lift state. The intake and exhaust valve actuators 136 and 138 may cause the intake and exhaust valves 122 and 130 to lift from their respective valve seats by a second amount when operating in the second lift state. The first and second amounts may be predetermined, nonzero values. In addition, and the second amount may be greater than the first amount. In this regard, the first lift state may be referred to as a low lift state, and the second lift state may be referred to as a high lift state.

When the intake and exhaust valve actuators 136 and 138 are cam driven, each of the intake and exhaust valve actuators 136 and 138 may include a cam follower having a height that is adjustable to vary the lift of the intake and exhaust valves 122 and 130. Alternatively, each of the intake and exhaust valve actuators 136 and 138 may include a solenoid that translates a camshaft segment along the length of one of the camshafts 140 and 142 to cause a cam follower to engage different lobes on the camshaft segment. The lobes may have different heights so that switching which one of the lobes the cam follower engages varies the lift of the intake and exhaust valves 122 and 130. Valve actuators such as these may be referred to as sliding cam actuators.

When the intake and exhaust valve actuators 136 and 138 are camless valve actuators, the valve actuators 136 and 138 may also adjust the timing of the intake and exhaust valves 122 and 130, respectively. When the intake and exhaust valve actuators 136 and 138 are cam driven, the timing of the intake and exhaust valves 122 and 130 may be adjusted by intake and exhaust cam phasers 148, 150, respectively. A phaser actuator module 158 may adjust the position of the intake and exhaust cam phasers 148, 150 based on signals received from the ECM 114.

The cylinder actuator module 120 may deactivate the cylinder 118 by instructing the valve lift actuator module 139 to disable opening of the intake valve 122 and/or the exhaust valve 130. When the intake valve actuator 136 is cam driven, the intake valve actuator 136 may disable opening of the intake valve 122 by decoupling the intake valve 122 from the intake camshaft 140. Similarly, when the exhaust valve actuator 138 is cam driven, the exhaust valve actuator 138 may disable opening of the exhaust valve 130 by decoupling the exhaust valve 130 from the exhaust camshaft 142.

In various implementations, the valve lift actuator module 139 may disable opening of the intake and exhaust valves 122 and 130 by switching the intake and exhaust valve actuators 136 and 138 to a third lift state. The intake and exhaust valve actuators 136 and 138 may lift the intake and exhaust valves 122 and 130 from their respective valve seats by a third amount when operating in the third lift state. The third amount may be zero. Thus, the third lift state may be referred to as a zero lift state.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbine 160-1. The EGR valve 170 may be controlled by an EGR actuator module 172 based on signals from the ECM 114.

A position of the crankshaft may be measured using a crankshaft position (CKP) sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The valve lift actuator module 139 controls the intake and exhaust valve actuators 136 and 138 to achieve a target lift state. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of active or deactivated cylinders.

Figure 2:
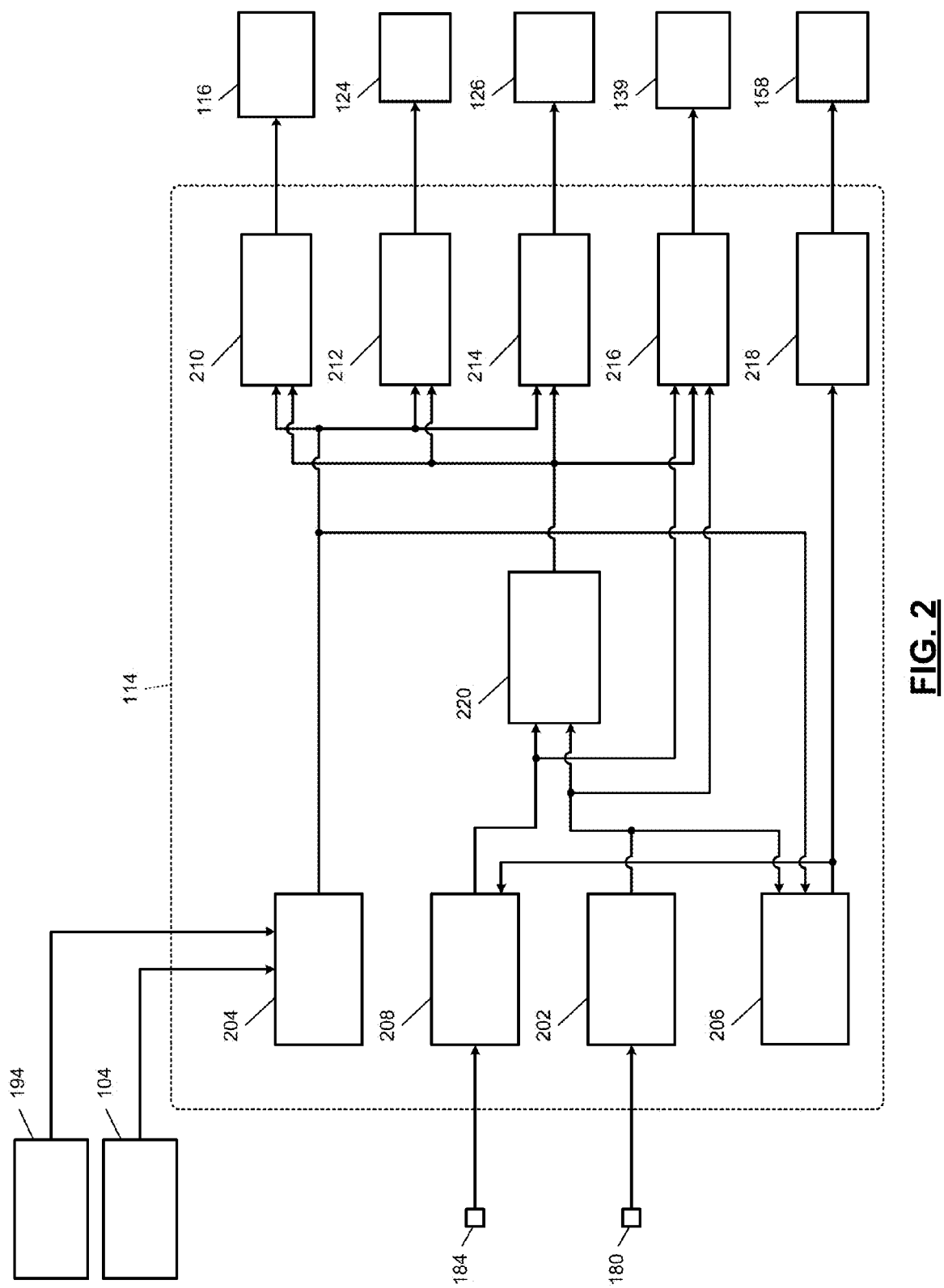
FIG. 2 is a functional block diagram of an example control system according to the principles of the present disclosure.

Referring now to FIG. 2, an example implementation of the ECM 114 includes an engine speed module 202, a desired torque module 204, a desired airflow module 206, and an engine load module 208. The engine speed module 202 determines the speed of the engine 102 based on the crankshaft position from the CKP sensor 180. For example, the engine speed module 202 may calculate the engine speed based on a period that elapses as the crankshaft completes one or more revolutions. The engine speed module 202 outputs the engine speed.

The desired torque module 204 determines a desired torque output of the engine 102 based on the driver input from the driver input module 104. The desired torque module 204 may store one or more mappings of accelerator pedal position, vehicle speed, and transmission gear to desired torque, and may determine the desired torque output based on a selected one of the mappings. The desired torque module 204 may receive the vehicle speed and the transmission gear from the transmission control module 194. The desired torque module 204 outputs the desired torque output.

The desired airflow module 206 determines a desired amount of airflow into the cylinders of the engine 102 based on the desired torque output and the engine speed. For example, the desired airflow module 206 may determine the desired airflow using a function and/or mapping that relates desired torque output and engine speed to desired airflow. The desired airflow module 206 may divide the desired airflow by the number of active cylinders in the engine 102 to obtain the desired amount of airflow into each cylinder of the engine 102, which may be referred to as a desired air per cylinder (APC). The desired airflow module 206 outputs the desired airflow.

The engine load module 208 determines the amount of load on the engine 102. The engine load module 208 may determine the engine load based on the desired airflow using, for example, a function and/or mapping that relates desired airflow to engine load. In various implementations, the engine load module 208 may determine the engine load based on a desired manifold pressure instead of or in addition to determining the engine load based on the desired airflow. The engine load module 208 outputs the engine load.

Figure 3:
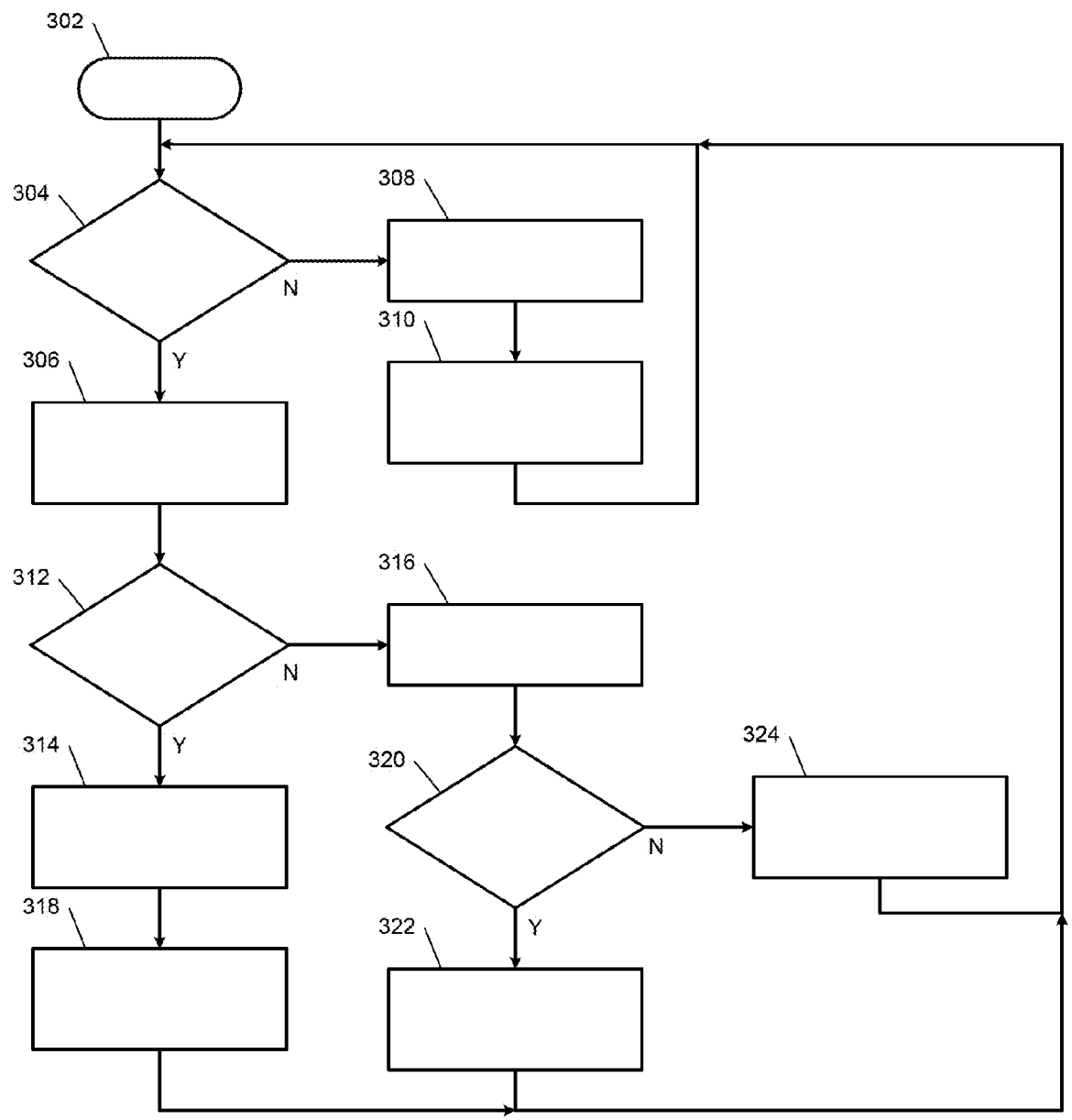
FIG. 3 is a flowchart illustrating an example control method according to the principles of the present disclosure.

The example implementation of the ECM 114 shown in FIG. 3 further includes a throttle control module 210, a fuel control module 212, a spark control module 214, a valve lift control module 216, a valve timing control module 218, and a cylinder deactivation module 220. The throttle control module 210 outputs a desired throttle position, and the throttle actuator module 116 adjusts the position of the throttle valve 112 to achieve the desired throttle position. The fuel control module 212 outputs a desired fueling rate, and the fuel actuator module 124 controls the fuel injector 125 to achieve the desired fueling rate. The fuel control module 212 may also output desired injection timing, in which case the fuel actuator module 124 may also control the fuel injector 125 to achieve the desired injection timing. The spark control module 214 outputs desired spark timing, and the spark actuator module 126 controls the spark plug 128 to achieve the desired spark timing.

The throttle control module 210, the fuel control module 212, and the spark control module 214 may adjust the throttle position, the fueling rate, and the spark timing, respectively, to achieve the desired torque output. In one example, the throttle control module 210 and the spark control module 214 adjust the throttle position and the spark timing based on the desired torque output, and the fuel control module 212 adjusts the fueling rate based on the desired air/fuel ratio. More specifically, the fuel control module 212 may adjust the desired fueling rate to minimize a difference between the desired air/fuel ratio and a measured air/fuel ratio. In various implementations, the throttle control module 210 may adjust the throttle position based on the desired airflow instead of adjusting the throttle position based directly on the desired torque output.

The valve lift control module 216 outputs a target lift state, and the valve lift actuator module 139 adjusts the lift state of the intake and exhaust valve actuators 136 and 138 to the target lift state. The valve lift control module 216 may adjust the target lift state based on the engine speed and/or the engine load as discussed below. The valve timing control module 218 outputs the target lift state. In various implementations, the valve lift control module 216 may output a target lift state for each of the intake and exhaust valve actuators 136 and 138 to independently control the lift state of the intake and exhaust valve actuators 136 and 138.

The valve timing control module 218 outputs a target valve timing, and the phaser actuator module 158 adjusts the position of the intake and exhaust cam phasers 148, 150 to achieve the target valve timing. The target valve timing may include a target valve opening time, a target valve opening duration, and/or a target valve closing time specified in crank angle degrees relative to TDC. In implementations where the intake and exhaust valve actuators 136 and 138 are camless valve actuators, the valve timing control module 218 outputs the target valve timing to the valve lift actuator module 139. In turn, the valve lift actuator module 139 adjusts the position of the intake and exhaust valve actuators 136 and 138 to achieve the target valve timing.

The cylinder deactivation module 220 selectively deactivates one or more cylinders in the engine 102 based on the engine load and/or the engine speed as discussed below. The cylinder deactivation module 220 outputs a signal indicating the number of active cylinders in the engine 102 and/or which cylinders are deactivated. The fuel control module 212 may stop fuel delivery to cylinders that are deactivated. The spark control module 214 may stop spark generation in cylinders that are deactivated. The valve lift control module 216 may disable opening of the intake and exhaust valves 122 and 130 associated with cylinders that are deactivated. As indicated above, the valve lift control module 216 may disable opening of the intake and exhaust valves 122 and 130 by switching the intake and exhaust valve actuators 136 and 138 to the third lift state (or zero lift state).

Referring now to FIG. 3, an example method for adjusting the lift state of a valve actuator and for adjusting the number of active cylinders in an engine to improve fuel economy begins at 302. The method is described in the context of the modules included in the example implementations of the ECM 114 shown in FIG. 2. However, the particular modules that perform the steps of the method may be different than the modules mentioned below and/or the method may be implemented apart from the modules of FIG. 2.

The method of FIG. 3 switches the target lift state of the intake valve actuator 136 between the first and second states while maintaining the target lift state of the exhaust valve actuator 138 at the second lift state. Adjusting the target lift state of the exhaust valve actuator 138 to the first lift state when the intake valve actuator 136 is adjusted to the first lift state may yield minimal fuel economy improvement. Thus, to eliminate the hardware and calibration effort required for multiple non-zero lift states, the method may not adjust the target lift state of the exhaust valve actuator 138 to the first lift state when the intake valve actuator 136 is adjusted to the first lift state. However, in various implementations, the method may adjust the target lift state of the exhaust valve actuator 138 in the same way that the method adjusts the target lift state of the intake valve actuator 136.

At 304, the valve lift control module 216 and/or the cylinder deactivation module 220 determines whether the engine speed is less than a first speed. The first speed may be a predetermined speed such as 3,000 revolutions per minute (RPM). If the engine speed is less than the first speed, the method continues at 306. Otherwise, the method continues at 308. At 308, the cylinder deactivation module 220 activates all of the cylinders in the engine 102. At 310, the valve lift control module 216 adjusts the target lift state of the intake valve actuator 136 to the second lift state.

At 306, the valve lift control module 216 and/or the cylinder deactivation module 220 determines first and second loads based on engine speed. As discussed below, the first and second loads may be thresholds that are used by the valve lift control module 216 and the cylinder deactivation module 220 to determine the target lift state of the number of active cylinders, respectively. The valve lift control module 216 and/or the cylinder deactivation module 220 may determine the first and second loads using a function and/or mapping that relates the engine speed to the first and second loads.

At 312, the valve lift control module 216 and/or the cylinder deactivation module 220 determines whether the engine load is less than the first load. If the engine load is less than the first load, the method continues at 314. Otherwise, the method continues at 316.

At 314, the cylinder deactivation module 220 deactivates one or more cylinders of the engine 102 while at least one cylinder of the engine 102 remains active. For example, if the engine 102 has four cylinders, the cylinder deactivation module 220 may deactivate two of the four cylinders for multiple engine cycles while the other two cylinders remain active. An engine cycle corresponds to one execution of a firing order of the engine 102 regardless of whether each cylinder in the firing order is active. In a four-stroke engine, an engine cycle corresponds to 720 degrees of crankshaft rotation. At 318, the valve lift control module 216 adjusts the target lift state of the intake valve actuator 136 to the first lift state.

At 316, the cylinder deactivation module 220 activates all of the cylinders in the engine 102. At 320, the valve lift control module 216 and/or the cylinder deactivation module 220 determines whether the engine load is greater than the second load. If the engine load is greater than the second load, the method continues at 322. Otherwise, the method continues at 324.

At 322, the valve lift control module 216 adjusts the target lift state of the intake valve actuator 136 to the second lift state. At 324, the valve lift control module 216 adjusts the target lift state of the intake valve actuator 136 to the first lift state. If the intake valve actuator 136 is already in the first lift state, the valve lift control module 216 may simply maintain the target lift state of the intake valve actuator 136 at the first lift state.

Figure 4:
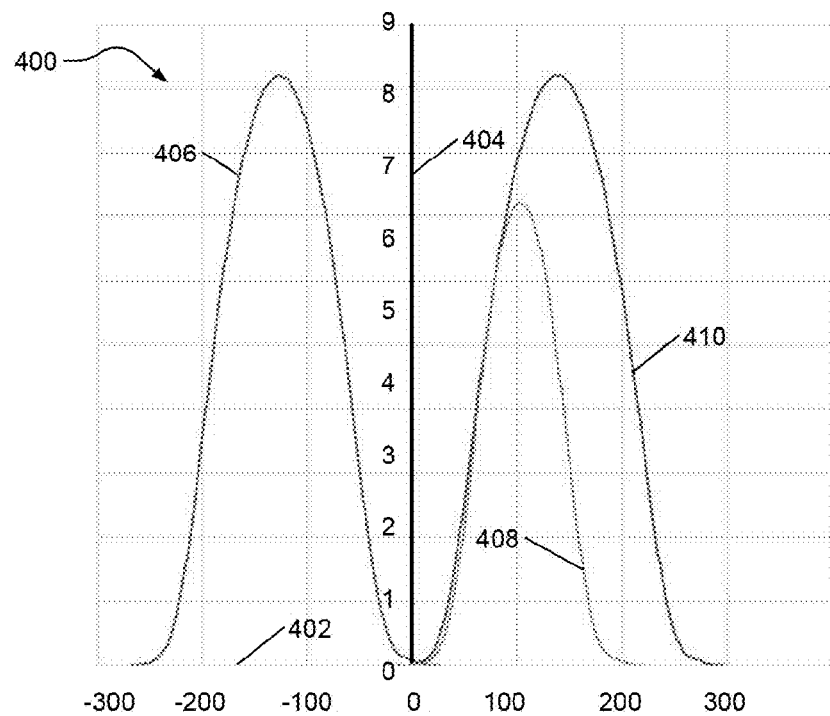
FIG. 4 is a graph illustrating example intake and exhaust valve lift profiles according to the principles of the present disclosure.

Referring now to FIG. 4, a graph 400 illustrates examples of valve lift profiles corresponding to the exhaust valve actuator 138 in the second state, the intake valve actuator 136 in the first state, and the intake valve actuator in the second state. The valve lift profiles are plotted with respect to an x-axis 402 representing crank angle in degrees and a y-axis 404 representing valve lift in millimeters. The valve lift profile corresponding to the exhaust valve actuator 138 in the second state is labeled 406. The valve lift profile corresponding to the intake valve actuator 136 in the first state is labeled 408. The valve lift profile corresponding to the intake valve actuator 136 in the second state is labeled 410.

Figure 5:
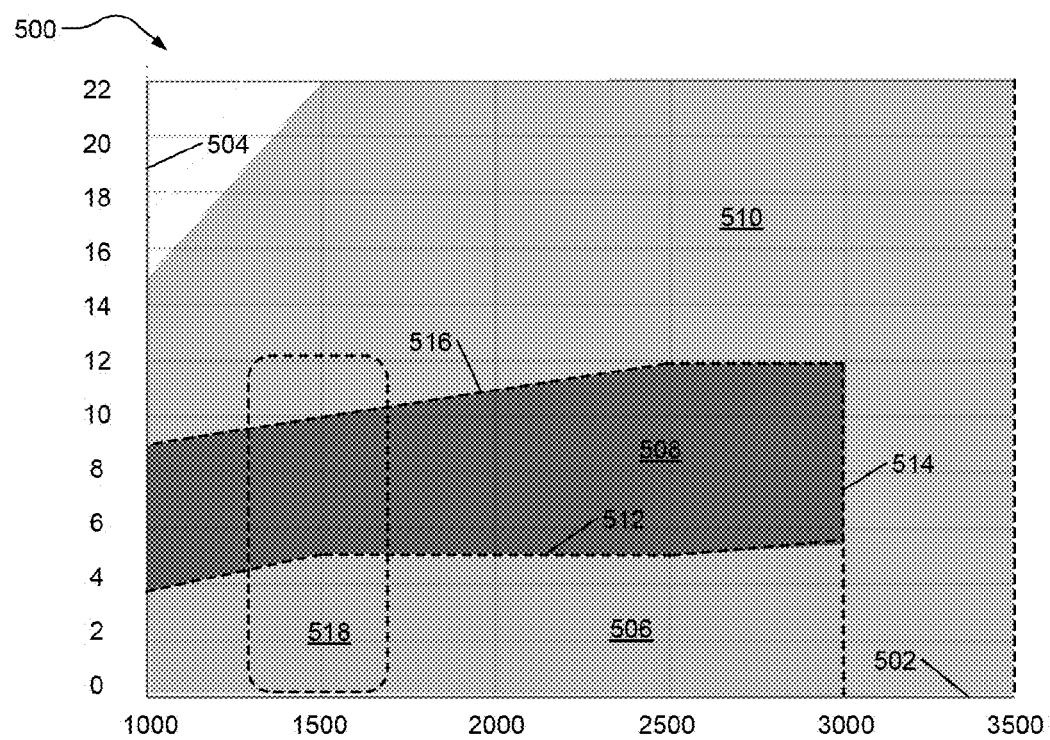
FIG. 5 is a graph illustrating example operating ranges for cylinder activation states and valve lift states according to the principles of the present disclosure.

Referring now to FIG. 5, a graph 500 illustrates operating ranges for various cylinder activation states and valve lift states. The operating ranges are plotted with respect to an x-axis 502 representing engine speed in RPM and a y-axis 504 representing brake mean effective pressure in bar. The y-axis 504 can be converted into engine load by scaling the brake mean effective pressure to torque output using engine displacement.

The operating ranges include a first operating range 506, a second operating range 508, and a third operating range 510. The first operating range 506 is defined by a first load boundary 512 and an engine speed boundary 514. In other words, the engine system 100 is operating in the first operating range 506 when the engine load is less than the first load boundary 512 and the engine sped is less than the engine speed boundary 514. The first load boundary 512 may correspond to the first load discussed above with reference to FIG. 3, and the engine speed boundary 514 may correspond to the first speed discussed above with reference to FIG. 3.

The second operating range 508 is defined by the first load boundary 512, a second load boundary 516 and the engine speed boundary 514. The engine system 100 is operating in the second operating range 508 when the engine load is greater than the first load boundary 512 and less than the second load boundary 516, and the engine speed is less than the engine speed boundary 514. The second load boundary 516 may correspond to the second load discussed above with reference to FIG. 3.

The third operating range 510 is defined by the second load boundary 516 and the engine speed boundary. The engine system 100 is operating in the third operating range 510 when the engine load is greater than the second load boundary 516 and/or when the engine speed is greater than the engine speed boundary 514. The engine system 100 may normally operate within a fourth operating range 518 that overlaps the first, second, and third operating ranges 506, 508, and 510.

When the engine system 100 is operating in the first operating range 506, the valve lift control module 216 adjusts the target lift state of the intake valve actuator 136 to the first lift state. In addition, the cylinder deactivation module 220 deactivates one or more cylinders of the engine 102. For example, if the engine 102 has four cylinders, the cylinder deactivation module 220 may deactivate two of the four cylinders for multiple engine cycles while the other two cylinders remain active.

When the engine system 100 is operating in the second operating range 508, the valve lift control module 216 adjusts the target lift state of the intake valve lift actuator 136 to the first lift state. In addition, the cylinder deactivation module 220 activates all of the cylinders in the engine 102. When the engine system 100 is operating in the third operating range 510, the valve lift control module 216 adjusts the target lift state of the intake valve actuator 136 to the second lift state. In addition, the cylinder deactivation module 220 activates all of the cylinders in the engine 102.

As the engine system 100 transitions between the first and second operating ranges 506 and 508, the valve lift control module 216 may simply maintain the target lift state of the intake valve actuator 136 at the first lift state. As the engine system 100 transitions between the second and third operating ranges 508 and 510, the cylinder deactivation module 220 may simply maintain all of the cylinders in the engine 102 in an active state. Notably, the valve lift control module 216 does not adjust the target lift state of the intake valve actuator 136 to the second lift state when one or more cylinders of the engine 102 are deactivated. This minimizes the number of transitions between cylinder activation states and between the first and second valve lift states, which minimizes valve timing adjustments and thereby improves fuel economy.

Figure 6:
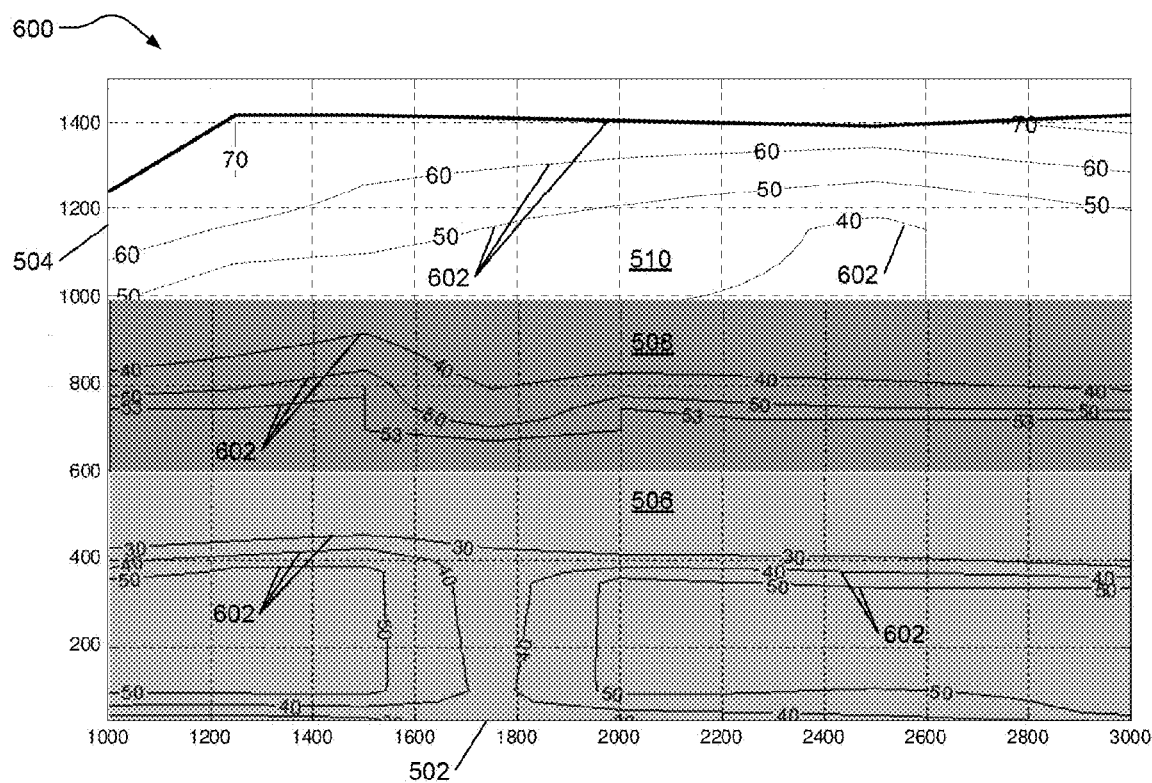
FIG. 6 is a graph illustrating example positions of an intake cam phaser as an engine system transitions through cylinder activation states and valve lift states.

Referring now to FIG. 6, a graph 600 illustrates the angular position of the intake cam phaser 148 as the engine system 100 transitions through the first, second, and third operating ranges 506, 508, and 510. Various contour lines 602 represent the angular position of the intake cam phaser 148 in degrees. Notably, since the cylinder deactivation module 220 does not adjust the number of active cylinders as the engine system 100 transitions between the second and third operating ranges 506 and 508, the change in the angular position of the intake cam phaser 148 is minimal.

Figure 7:
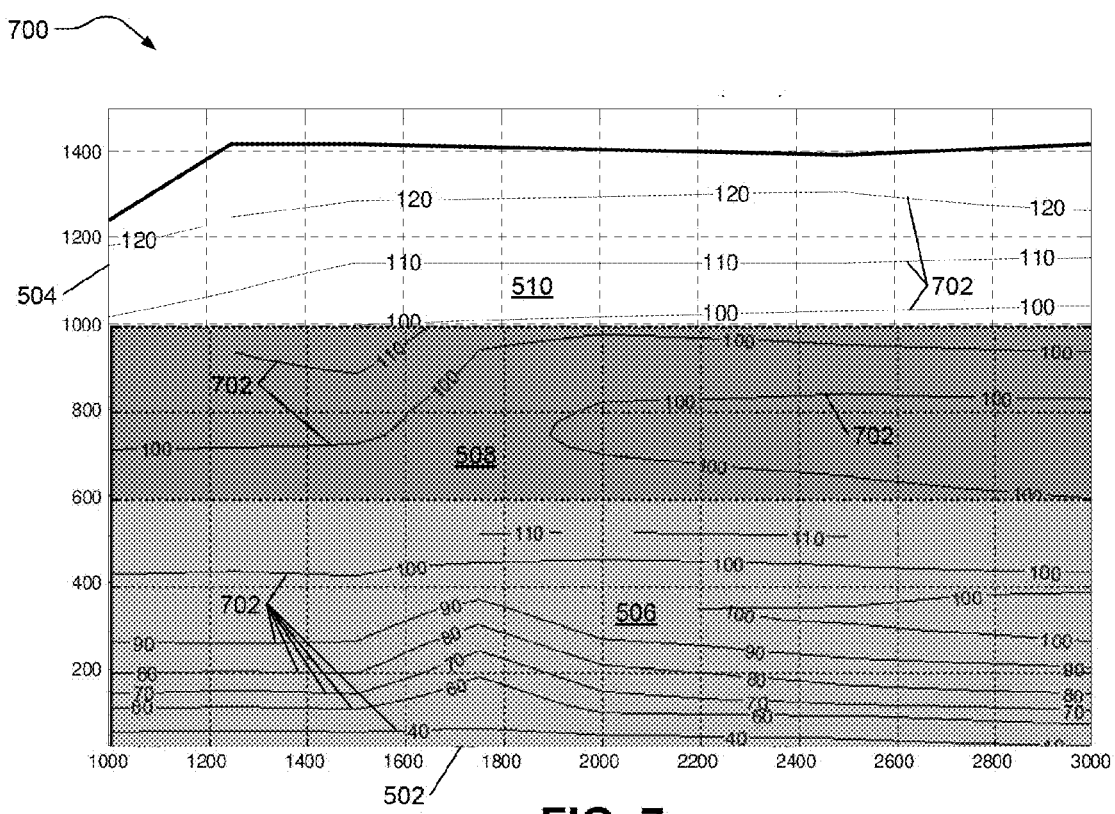
FIG. 7 is a graph illustrating example pressures within an intake manifold as an engine system transitions through cylinder activation states and valve lift states.

Referring now to FIG. 7, a graph 700 illustrates the pressure within the intake manifold 110 as the engine system 100 transitions through the first, second, and third operating ranges 506, 508, and 510. Various contour lines 702 represent the pressure within the intake manifold 110 in kilopascals (kPa). Notably, due to the selection of the first and second load boundaries 512 and 516, there is minimal change in the manifold pressure as the engine system 100 transitions between the first, second, and third operating ranges 506, 508, and 510.

Thus, the first and second load boundaries 512 and 516 may be selected (e.g., through calibration) to minimize change in the manifold pressure as the engine system 100 transitions between the first, second, and third operating ranges 506, 508, and 510. In addition, the first load boundary 512 may be selected to minimize the amount of change in the brake specific fuel consumption of the engine 102 as the engine system 100 transitions between the first and second operating ranges 506 and 508. Similarly, the second load boundary 516 may be selected to minimize the amount of change in the brake specific fuel consumption of the engine 102 as the engine system 100 transitions between the second and third operating ranges 508 and 510.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system comprising:
a cylinder deactivation module that selectively deactivates a first cylinder of an engine while a second cylinder of the engine is active; and
a valve lift control module that:
when the first cylinder is deactivated, selectively adjusts a target lift state of a valve actuator of the engine to a first lift state to lift at least one of an intake valve of the second cylinder and an exhaust valve of the second cylinder by a first amount; and
selectively adjusts the target lift state of the valve actuator to a second lift state to lift at least one of the intake valve of the second cylinder and the exhaust valve of the second cylinder by a second amount, wherein the first and second amounts are greater than zero and the second amount is greater than the first amount.

2. The system of claim 1 wherein:
the cylinder deactivation module selectively deactivates the first cylinder when the load on the engine is less than a first load; and
the valve lift control module selectively adjusts the target lift state of the valve actuator to the first lift state when the engine load is less than the first load.

3. The system of claim 2 wherein at least one of the cylinder deactivation module and the valve lift control module determines the first load based on the speed of the engine.

4. The system of claim 2 wherein:
the cylinder deactivation module deactivates the first cylinder when the engine load is less than the first load and the speed of the engine is less than a first speed; and
the valve lift control module adjusts the target lift state of the valve actuator to the first lift state when the engine load is less than the first load and the engine speed is less than the first speed.

5. The system of claim 4 wherein:
the cylinder deactivation module activates all cylinders of the engine when the engine speed is greater than the first speed; and
the valve lift control module adjusts the target lift state of the valve actuator to the second lift state when the engine speed is greater than the first speed.

6. The system of claim 4 wherein:
the cylinder deactivation module activates all cylinders of the engine when the engine load is greater than the first load; and
the valve lift control module selectively maintains the target lift state of the valve actuator at the first lift state when the engine load is greater than the first load and less than a second load, wherein the second load is greater than the first load.

7. The system of claim 6 wherein the valve lift control module maintains the target lift state of the valve actuator at the first lift state when:
the engine load is greater than the first load and less than the second load; and
the engine speed is less than the first speed.

8. The system of claim 6 wherein:
the cylinder deactivation module continues to activate all cylinders of the engine when the engine load is greater than the second load; and
the valve lift control module adjusts the target lift state of the valve actuator to the second lift state when the engine load is greater than the second load.

9. The system of claim 1 wherein the valve lift control module adjusts the target lift state of the valve actuator to adjust the amount by which the intake valve of the second cylinder is lifted.

10. The system of claim 1 wherein the valve lift control module does not adjust the target lift state of the valve actuator to the second lift state when at least one cylinder of the engine is deactivated.

11. A method comprising:
selectively deactivates a first cylinder of an engine while a second cylinder of the engine is active;
when the first cylinder is deactivated, selectively adjusting a target lift state of a valve actuator of the engine to a first lift state to lift at least one of an intake valve of the second cylinder and an exhaust valve of the second cylinder by a first amount; and
selectively adjusting the target lift state of the valve actuator to a second lift state to lift at least one of the intake valve of the second cylinder and the exhaust valve of the second cylinder by a second amount, wherein the first and second amounts are greater than zero and the second amount is greater than the first amount.

12. The method of claim 11 further comprising:
selectively deactivating the first cylinder when the load on the engine is less than a first load; and
selectively adjusting the target lift state of the valve actuator to the first lift state when the engine load is less than the first load.

13. The method of claim 12 further comprising determining the first load based on the speed of the engine.

14. The method of claim 12 further comprising:
deactivating the first cylinder when the engine load is less than the first load and the speed of the engine is less than a first speed; and
adjusting the target lift state of the valve actuator to the first lift state when the engine load is less than the first load and the engine speed is less than the first speed.

15. The method of claim 14 further comprising:
activating all cylinders of the engine when the engine speed is greater than the first speed; and
adjusting the target lift state of the valve actuator to the second lift state when the engine speed is greater than the first speed.

16. The method of claim 14 further comprising:
activating all cylinders of the engine when the engine load is greater than the first load; and
selectively maintaining the target lift state of the valve actuator at the first lift state when the engine load is greater than the first load and less than a second load, wherein the second load is greater than the first load.

17. The method of claim 16 further comprising maintaining the target lift state of the valve actuator at the first lift state when:
the engine load is greater than the first load and less than the second load; and
the engine speed is less than the first speed.

18. The method of claim 16 further comprising:
continuing to activate all cylinders of the engine when the engine load is greater than the second load; and
adjusting the target lift state of the valve actuator to the second lift state when the engine load is greater than the second load.

19. The method of claim 11 further comprising adjusting the target lift state of the valve actuator to adjust the amount by which the intake valve of the second cylinder is lifted.

20. The method of claim 11 further comprising not adjusting the target lift state of the valve actuator to the second lift state when at least one cylinder of the engine is deactivated.

* * * * *